United States Patent
Hayakawa et al.

(10) Patent No.: US 8,916,283 B2
(45) Date of Patent: Dec. 23, 2014

(54) BINDER FOR SEPARATOR OF NON-AQUEOUS ELECTROLYTE BATTERY COMPRISING 2-CYANOETHYL GROUP-CONTAINING POLYMER AND SEPARATOR AND BATTERY USING THE SAME

(75) Inventors: Kazuhisa Hayakawa, Joetsu (JP); Ikuo Fukui, Joetsu (JP); Soji Tanioka, Tokyo (JP); Masahiro Ohgata, Osaka (JP); Masaaki Kajitani, Osaka (JP)

(73) Assignees: Shin-Etsu Chemical Co., Ltd., Tokyo (JP); Matsugaki Chemical Industries Co., Ltd., Osaka (JP)

( * ) Notice: Subject to any disclaimer, the term of this patent is extended or adjusted under 35 U.S.C. 154(b) by 0 days.

(21) Appl. No.: 13/430,812

(22) Filed: Mar. 27, 2012

(65) Prior Publication Data
US 2012/0258349 A1   Oct. 11, 2012

(30) Foreign Application Priority Data
Apr. 5, 2011   (JP) .................................. 2011-084066

(51) Int. Cl.
H01M 2/16    (2006.01)
H01M 10/0525  (2010.01)
H01M 10/0566  (2010.01)

(52) U.S. Cl.
CPC ............ *H01M 2/1653* (2013.01); *H01M 2/166* (2013.01); *H01M 2/1686* (2013.01); *H01M 10/0525* (2013.01); *H01M 10/0566* (2013.01)
USPC ........................................... 429/144; 525/61

(58) Field of Classification Search
None
See application file for complete search history.

(56) References Cited

U.S. PATENT DOCUMENTS

| | | | |
|---|---|---|---|
| 2,332,049 A | 10/1943 | Bock et al. | |
| 4,322,524 A | 3/1982 | Onda et al. | |
| 5,869,732 A | 2/1999 | Nishikawa et al. | |
| 2006/0008700 A1 | 1/2006 | Yong et al. | |
| 2007/0054184 A1 | 3/2007 | Yong et al. | |
| 2008/0292968 A1 | 11/2008 | Lee et al. | |
| 2010/0316903 A1 | 12/2010 | Kim et al. | |
| 2011/0064988 A1 | 3/2011 | Yu | |
| 2011/0251319 A1* | 10/2011 | Song et al. | 524/233 |
| 2012/0258348 A1 | 10/2012 | Hayakawa et al. | |
| 2012/0258349 A1 | 10/2012 | Hayakawa et al. | |
| 2012/0259067 A1 | 10/2012 | Fukui et al. | |

FOREIGN PATENT DOCUMENTS

| | | |
|---|---|---|
| JP | 59226001 A | 12/1984 |
| JP | 4357695 A | 12/1992 |
| JP | 5178903 A | 7/1993 |
| JP | 2010-15917 A | 1/2010 |
| JP | 2010-50076 A | 3/2010 |
| KR | 20110129203 A | 12/2011 |
| WO | WO 2006/004366 A1 | 1/2006 |
| WO | WO 2006/068428 A1 | 6/2006 |
| WO | WO 2007/066967 A1 | 6/2007 |
| WO | WO 2008/097013 A1 | 8/2008 |
| WO | WO 2008/108583 A1 | 9/2008 |
| WO | WO 2009/014388 A2 | 1/2009 |
| WO | WO 2009/066916 A2 | 5/2009 |
| WO | WO 2009/069928 A2 | 6/2009 |
| WO | WO 2009/110726 A2 | 9/2009 |

OTHER PUBLICATIONS

Tsutsumi et al. "High ionic conductive behavior of cyanoethylated polyvinylalcohol- and polyacrylonitrile-based electrolytes", *Solid State Ionics* 177:2683-2686 (2006).
Supplementary European Search Report corresponding to European Application No. 12162579.2 dated May 29, 2012.
Li et al. "Synthesis and Hydrolysis of β-Cyanoethyl Ether of Poly-(vinyl alcohol)", *Journal of Applied Polymer Sciences* 73:2771-2777 (1999).
European Search Report corresponding to European Application No. 12162573.5 dated Jun. 14, 2012.
European Search Report corresponding to European Application No. 12162563.6 dated Jun. 12, 2012.
Extended European Search Report corresponding to European Application No. 12162588.3 dated Jul. 26, 2012.

* cited by examiner

*Primary Examiner* — Sarah A Slifka
(74) *Attorney, Agent, or Firm* — Myers Bigel Sibley & Sajovec, P.A.

(57) ABSTRACT

An object of the invention is to provide a binder for a separator which can be comprised by a non-aqueous electrolyte battery with improved heat resistance, a separator comprising the binder, and a non-aqueous electrolyte battery comprising the separator. More specifically, provided are a binder for a separator of a non-aqueous electrolyte battery comprising at least a 2-cyanoethyl group-containing polymer having a molecular weight distribution (Mw/Mn), which is a ratio of a weight-average molecular weight (Mw) to a number-average molecular weight (Mn), of 6 or less, the weight-average molecular weight (Mw) of 50,000 to 1,000,000, and 30% by weight or less of a low molecular weight portion having a molecular weight of 30,000 or less.

10 Claims, No Drawings

BINDER FOR SEPARATOR OF NON-AQUEOUS ELECTROLYTE BATTERY COMPRISING 2-CYANOETHYL GROUP-CONTAINING POLYMER AND SEPARATOR AND BATTERY USING THE SAME

RELATED APPLICATION

This application claims priority from Japanese Patent Application No. 2011-084066, filed Apr. 5, 2011, the disclosure of which is incorporated by reference herein in its entirety.

BACKGROUND OF THE INVENTION

The present invention relates to a separator of a battery, the separator comprising a porous substrate and a heat-resistant porous layer, wherein the heat-resistant porous layer comprises a 2-cyanoethyl group-containing polymer having a specific molecular weight distribution and a weight-average molecular weight as a binder; and a non-aqueous electrolyte battery with improved heat resistance comprising the separator.

Recently, as a power source for a mobile terminal such as that of a notebook computer or a cellular phone or as a power source for a hybrid car or an electric car, a non-aqueous electrolyte battery with high voltage and high energy density, in particular a lithium ion secondary battery, is getting the attention.

The non-aqueous electrolyte battery typified by a lithium ion secondary battery has high capacity and high energy density so that a large electric current flows at the time of internal short circuit or external short circuit of the battery. Thus, there is a problem that heat is generated in the battery due to Joule heat caused by short circuit, the battery is swelled due to gas generation accompanied with decomposition of an electrolyte solution, and properties of the battery are deteriorated.

According to a current lithium ion secondary battery, in order to resolve such a problem, a separator comprising a porous substrate having fine pores such as a polypropylene or polyethylene film is interposed between a negative electrode and a positive electrode. When the temperature increases owing to the heat generated by short circuit, the separator comprising the porous substrate melts to block the pores. As a result, movement of ions is inhibited so that the current does not flow and runaway of the battery is suppressed.

Because of wider use of a lithium ion secondary battery, a battery having higher heat resistance, in particular improved heat resistance at the time of internal short circuit has been currently required.

When the internal short circuit occurs, it is believed that the temperature increases to 600° C. or higher at the short circuit region owing to local heat generation. Thus, in a conventional separator comprising a porous substrate having fine pores such as a polyolefin film, the separator is shrunken or melted by heat generated by the short circuit at the short circuit region so that the battery is exposed to dangers of fuming, ignition and explosion.

As a method for preventing the short circuit caused by heat shrinkage or heat melting of a separator and improving reliability of a battery, a multilayer separator comprising a heat-resistant porous layer on one or both surfaces (i.e., frond and back surfaces) of a porous substrate having fine pores such as a polyethylene film is suggested (JP 2010-015917A; JP 2009-518809T, which is a National Phase Publication of WO 2007/066967; JP 2008-503049T, which a National Phase Publication of WO 2006/004366; and JA 2010-50076A). It is also disclosed that a 2-cyanoethyl group-containing polymer is used as a binder in a heat-resistant porous layer (JP 2009-518809T and JP 2008-503049T).

SUMMARY OF THE INVENTION

However, even for a separator comprising the 2-cyanoethyl group-containing polymer as a binder in a heat-resistant porous layer, further improvement for enhancing the heat resistance of the heat-resistant porous layer is still required.

The present invention is completed under the above circumstances. An object of the invention is to provide a binder for a separator which can be comprised by a non-aqueous electrolyte battery with improved heat resistance; a separator comprising the binder; and a non-aqueous electrolyte battery comprising the separator.

As a result of intensive studies, the present inventors have found that a separator of a non-aqueous electrolyte battery, comprising a 2-cyanoethyl group-containing polymer having a certain range of molecular weight distribution and a certain range of a weight-average molecular weight as a binder, can have a sufficient adhesion for binding inorganic filler particles each other in an electrolyte solution as well as an excellent mechanical strength of a heat-resistant porous layer even in an electrolyte solution. They have completed the invention based on the finding.

According to the invention, provided is a binder for a separator of a non-aqueous electrolyte battery, the binder comprising at least a 2-cyanoethyl group-containing polymer having a molecular weight distribution (Mw/Mn), which is a ratio of a weight-average molecular weight (Mw) to a number-average molecular weight (Mn), of 6 or less, the weight-average molecular weight (Mw) of 50,000 to 1,000,000, and 30% by weight or less of a low molecular weight portion having a molecular weight of 30,000 or less.

According to the invention, a binder for a separator which can produce a non-aqueous electrolyte battery with excellent heat resistance; the separator comprising the binder; and the non-aqueous electrolyte battery comprising the separator can be provided.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

According to the invention, a binder for a separator of a non-aqueous electrolyte battery comprises a 2-cyanoethyl group-containing polymer having a molecular weight distribution (Mw/Mn) of 6 or less, preferably 5 or less; a weight-average molecular weight (Mw) of 50,000 to 1,000,000, preferably 70,000 to 800,000; and 30% by weight or less of, preferably 20% by weight or less of a low molecular weight portion having a molecular weight of 30,000 or less. Since the 2-cyanoethyl group-containing polymer hardly dissolves in an electrolyte solution, it can strongly bind inorganic filler particles as a binder and enhance mechanical strength of the separator. As a result, heat resistance of the separator can be enhanced. On the other hand, when the 2-cyanoethyl group-containing polymer has a molecular weight distribution of more than 6, or more than 30% by weight of a low molecular weight portion having a molecular weight of 30,000 or less, a significant amount of the low molecular weight portion of the 2-cyanoethyl group-containing polymer is dissolved in an electrolyte solution so that the mechanical strength of a heat-resistant porous layer in the separator and the heat resistance of the battery is lowered. Further, when the weight-average molecular weight is less than 50,000, a viscosity of the slurry used for forming a heat-resistant porous layer is lowered. As a result, dripping occurs during coating of a surface of a porous substrate so that the heat-resistant porous layer having a uniform thickness cannot be formed. When the weight-average molecular weight is more than 1,000,000, a viscosity of the slurry becomes too high so that coating a surface of a porous substrate to form the heat-resistant porous layer becomes difficult. The molecular weight can be measured by gel permeation chromatography (GPC).

The 2-cyanoethyl group-containing polymer can be produced by the Michael addition reaction between acrylonitrile and a polymer having a hydroxyl group in the molecule thereof as shown in the following reaction formula:

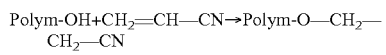

wherein Polym-OH represents a hydroxyl group-containing polymer and Polym-O—CH$_2$—CH$_2$—CN represents a 2-cyanoethyl group-containing polymer.)

The 2-cyanoethyl group-containing polymer may be produced, for example, by a method comprising the steps of dissolving a hydroxyl group-containing polymer in the molecule thereof in water, adding a catalyst such as caustic soda or sodium carbonate thereto, further adding acrylonitrile thereto, and then carrying out the reaction for 2 to 12 hours at 0 to 60° C. Although acrylonitrile can function also as a solvent, a dilution solvent such as isopropyl alcohol, methyl ethyl ketone, acetone or the other solvent which does not react with acrylonitrile may be optionally added. After the reaction is over, the reaction solution is separated into two phases of an aqueous phase and an organic phase containing the 2-cyanoethyl group-containing polymer. After the organic phase is collected, water is added thereto to allow the crude product of 2-cyanoethyl group-containing polymer to precipitate. When the obtained crude product is washed in a great amount of water, and/or repeatedly subjected to re-dissolution/re-precipitation, a 2-cyanoethyl group-containing polymer which contains bis-cyanoethyl ether in an amount of 0.5% by weight or less as a by-product can be obtained. As for the hydroxyl group-containing polymer as a reacting material, any polymer can be used insofar as a 2-cyanoethyl group-containing polymer having a desirable molecular weight distribution and a desirable weight-average molecular weight and the like can be obtained.

Examples of the 2-cyanoethyl group-containing polymer include cyanoehtyl polysaccharides such as cyanoethyl pullulan, cyanoethyl cellulose, cyanoethyl dihydroxypropyl pullulan, cyanoethyl hydroxyethyl cellulose, cyanoethyl hydroxypropyl cellulose and cyanoethyl starch; and cyanoethyl polyvinyl alcohol. In particular, cyanoethyl polyvinyl alcohol is preferable. Since cyanoethyl polyvinyl alcohol is a binder which can form strong adhesion among inorganic filler particles and has flexibility, problems such as cracking do not easily occur when the separator is bent or folded.

Further, a ratio of replacement by cyanoethyl groups in the 2-cyanoethyl group-containing polymer is 30% or more, preferably 40% or more. When the ratio of replacement by cyanoethyl groups is less than 30%, the permittivity is lowered so that sufficient ion conductivity may not be obtained. Further, solvent solubility is lowered and the viscosity of the slurry used for forming a heat-resistant porous layer becomes low so that a drip may occur when it is coated on a surface of the porous substrate.

The ratio of replacement by cyanoethyl groups can be represented by the ratio (%) of mole number of hydroxyl groups replaced by cyanoethyl groups to mole number of hydroxyl groups per monomer unit of a hydroxyl group-containing polymer, which is a starting raw material.

The inventors found that, in a process for producing the 2-cyanoethyl group-containing polymer, the ratio of replacement by 2-cyanoethyl groups in the 2-cyanoethyl group-containing polymer is enhanced by addition of an aqueous solution of a catalyst such as caustic soda after preparation of an aqueous solution of a hydroxyl group-containing polymer such as polyvinyl alcohol. Thus, in the process for producing a 2-cyanoethyl group-containing polymer, to obtain a 2-cyanoethyl group-containing polymer having 30% or more of the ratio of replacement by 2-cyanoethyl groups, a hydroxyl group-containing polymer in the molecule thereof is homogenously dissolved in water at first as described above, then the aqueous solution of hydroxyl group-containing polymer is mixed with caustic soda until they becomes homogenous, an aqueous solution of a catalyst such as sodium carbonate is added thereto, and then acrylonitrile is added for the reaction. The ratio of replacement by 2-cyanoethyl groups can be calculated based on the nitrogen content in the 2-cyanoethyl group-containing polymer as measured by Kjeldahl method.

As for a binder for forming a heat-resistant porous layer, the 2-cyanoethyl group-containing polymer may be used alone, or optionally mixed with a binder resin such as ethylene-vinyl acetate copolymer (EVA, containing 20 to 35 mol % of repeating unit derived from vinyl acetate), acrylate copolymer, styrene butadiene rubber (SBR), polyvinyl butyral (PVB), polyvinyl pyrrolidone (PVP), polyurethane, poly(vinylidene fluoride-hexafluoropropylene) copolymer, poly(vinylidene fluoride-trichloroethylene) copolymer, poly(vinylidene fluoride-chlorotrifluoroethylene) copolymer, poly(vinylidene fluoride-hexafluoropropylene) copolymer, poly(vinylidene fluoride-trichloroethylene) copolymer, cellulose acetate, cellulose acetate butyrate or cellulose acetate propionate. When it is mixed with the binder resin, 10 to 1000 parts by weight of the binder resin relatively to 100 pars by weight of the 2-cyanoethyl group-containing polymer can be used.

The inorganic filler is not particularly limited insofar as it has a melting point of 200° C. or more, a high electric insulation, electrochemical stability and stability in an electrolyte solution or a solvent used for slurry for forming the heat-resistant porous layer. Examples of the inorganic filler include particles of inorganic oxides such as iron oxide, SiO$_2$ (silica), Al$_2$O$_3$ (alumina), TiO$_2$, BaTiO$_3$, ZrO, PB(Mg$_{3}$Nb$_{2/3}$)O$_{3}$—PbTiO$_{3}$ (PMN-PT), hafnia (HfO$_{2}$), SrTiO$_{3}$, SnO$_{2}$, CeO$_{2}$, MgO, NiO, CaO, ZnO, ZrO$_{2}$ and Y$_{2}$O$_{3}$; particles of inorganic nitrides such as aluminum nitride and silicon nitride; particles of poorly soluble ionic crystals such as calcium fluoride, barium fluoride and barium sulfate; particles of covalent crystals such as silicone and diamond; particles of clay such as talc and montmorillonite; a material derived from a mineral such as boehmite, zeolite, apatite, kaolin, mullite, spinel, olivine, sericite and bentonite, or lithium titanium phosphate (Li$_{x}$Ti$_{y}$(PO$_{4}$)$_{3}$, wherein x and y are numbers satisfying 0<x<2 and 0<y<3, respectively); and any combination thereof.

The particle diameter of the inorganic filler is not particularly limited. The mean particle diameter is preferably from 5 nm to 5 μm, more preferably from 0.01 to 1 μm in view of formation of a heat-resistant porous layer having a uniform thickness and formation of an appropriate void ratio. The mean particle diameter can be measured by a device based on a laser diffraction scattering method. When the mean particle diameter of the inorganic filler is less than 5 nm, dispersibilty of the inorganic filler is lowered so that it may be difficult to control the physical properties of the separator. When it is more than 5 μm, strength of the heat resistant-porous layer is lowered so that the layer becomes brittle and smoothness of the surface tends to get deteriorated. In addition, a heat-resistant porous layer containing the same content of solid particles becomes thicker so that the mechanical properties are lowered.

A method for forming the heat-resistant porous layer is not particularly limited. For example, the heat-resistant porous layer may be formed by coating the porous substrate with a slurry in which an inorganic filler has been dispersed in a solution of a binder in a solvent, and drying for removing the solvent.

The solvent for dissolving the binder is not particularly limited insofar as the binder is dissolved therein. Examples of the solvent include acetone, tetrahydrofuran, cyclohexanone, ethylene glycol monomethyl ether, methyl ethyl ketone, acetonitrile, furfuryl alcohol, tetrahydrofurfuryl alcohol, methyl acetoacetate, nitromethane, N,N-dimethylformamide (DMF), N-methyl-2-pyrrolidone, γ-butyrolactone and propylene carbonate. The solvent may be mixed, for example, in an amount of 300 to 5000 parts by weight relatively to 100 parts by weight of the binder.

As for the method for dispersing an inorganic filler in a binder solution, a known method of using a stirrer, a disperser, a pulverizer or the like can be employed. In particular, a ball mill method is preferable.

A mixture ratio of the inorganic filler to the binder in slurry is not particularly limited. A thickness, an average pore diameter and a porosity of the final product of heat-resistant porous layer can be controlled by the mixture ratio. The inorganic filler content in the heat-resistant porous layer is preferably from 50% by weight to 95% by weight. When the inorganic filler content is less than 50% by weight, a pore portion in the heat resistant-porous layer becomes small so that the battery performance may be deteriorated or sufficient heat resistance may not be obtained. When it is more than 95% by weight, the heat resistant-porous layer may become brittle so that it may be difficult to handle.

The heat-resistant porous layer can have low resistance because the pores ensure a route for ionic conduction. The average pore diameter is not particularly limited insofar as they are large enough for the lithium ions contained in an electrolyte solution described below to pass through. The average pore diameter is preferably 5 nm to 5 μm, particularly preferably 0.1 to 3 μM from the viewpoint of mechanical strength of the heat resistant porous layer. The porosity is preferably 5 to 95%, particularly preferably 20 to 70%. The average pore diameter can be measured by using a mercury intrusion porosimeter. The porosity is calculated based on the following formula, after obtaining true density (d) of an inorganic filler, volume (v) of a heat-resistant porous layer and weight (m) of a heat-resistant porous layer.

$$\text{Porosity (\%)}=\{1-m/(vd)\}\times 100$$

The heat-resistant porous layer having a porosity of 5 to 95% and an average pore diameter of 5 nm to 5 μm can be obtained by controlling the particle diameter of inorganic particles or the weight ratio of inorganic particles to the binder.

According to the invention, the separator for a non-aqueous electrolyte battery comprises a porous substrate and a heat-resistant porous layer comprising an inorganic filler and the binder described above. The heat resistant-porous layer is formed on one or both surfaces of the porous substrate. The inside of the heat resistant-porous layer preferably contains many pores resulting from the voids present among inorganic filler particles. When the heat resistant-porous layer is formed on one surface of the porous substrate, the heat resistant-porous layer may be formed on a positive electrode side or an negative electrode side of the porous substrate.

The porous substrate is not particularly limited and may be a thermoplastic resin which can melt to close the pores in the porous substrate and block ion movement so that an electric current can stop and excess heat or ignition of the battery can be suppressed, for example, when the temperature becomes higher than a certain limit. Examples of the porous substrate include substrates of polyolefins such as low density polyethylene, high density polyethylene, ultra high molecular weight polyethylene and polypropylene; polyesters such as polyethylene terephthalate and polybutylene terephthalate; polyacetal; polyamide; polycarbonate; polyimide; polyether ether ketone; polyether sulfone; and any combination of thereof.

The porous substrate is preferably a film. Although the thickness of the porous substrate is not particularly limited, it is preferably 2 to 50 μm. When it is less than 2 μm, the mechanical properties may not be maintained. When it is more than 50 μM, it may function as a resistant layer. Although the average pore diameter and the porosity of the porous substrate are not particularly limited, the average pore diameter is preferably 0.1 to 30 μm and the porosity is preferably 10 to 90%. The porosity means the volume ratio of pores in a porous substrate. When the average pore diameter is less than 0.1 μm and the porosity is less than 10%, ion conductivity may be lowered. When the average pore diameter is more than 30 μm and the porosity is higher than 90%, the mechanical strength may be lowered so that the function as a substrate may not be attained. The average pore diameter can be measured in the same manner as that for the heat-resistant porous layer. The porosity is calculated based on the following formula, after obtaining true density (d) of a porous substrate, volume (v) of a porous substrate, and weight (m) of a porous substrate.

$$\text{Porosity (\%)}=\{1-m/(vd)\}\times 100$$

A method of coating the porous substrate with the slurry includes a coating method commonly used in the art, and is not particularly limited insofar as a desirable film and coating area can be achieved. Examples of the method include a gravure coater method, a reverse roll coater method, a transfer roll coater method, a kiss coater method, a dipping coater method, a knife coater method, an air doctor coater method, a blade coater method, a rod coater method, a squeeze coater method, a cast coater method, a die coater method, a screen printing method and a spray coating method.

According to the invention, the total thickness of the separator which is thus obtained is not particularly limited and can be adjusted in consideration of the battery performance. It is preferably in the range of 2 to 55 μm from the viewpoint of ensuring separation between a positive electrode and a negative electrode.

According to the invention, the non-aqueous electrolyte battery comprises a positive electrode, a negative electrode, the separator described above and an electrolyte solution. More specifically, the separator placed between a positive electrode and a negative electrode is immersed in an electrolyte solution to produce a non-aqueous electrolyte battery. A separator comprising a heat-resistant porous layer formed on a surface of a porous substrate may be placed in such a manner that a surface of the heat-resistant porous layer side faces any side of the positive electrode and negative electrode. According to the invention, preferred examples of the non-aqueous electrolyte battery include a lithium secondary battery such as a lithium metal secondary battery, a lithium ion secondary battery, a lithium polymer secondary battery, or a lithium ion polymer secondary battery.

According to the invention, the electrode which can be used with the separator is generally produced by coating an electrode current collector with a dispersion of an electrode active material and an electroconductive aid in a binder solution.

A positive electrode active material can include a lithium-containing transition metal oxide having a layer structure, typified by the chemical formula of $Li_{1+x}MO_2$ wherein $-0.1 < x < 0.1$ and M is Co, Ni, Mn, Al, Mg, Zr, Ti, Sn or the like; a lithium manganese oxide having a spinel structure such as $LiMn_2O_4$ or a composition having part of the elements in $LiMn_2O_4$ substituted with one or more of the other elements; and an olivine type compound represented by $LiMPO_4$ wherein M is Co, Ni, Mn, Fe or the like. Specific examples of the lithium-containing transition metal oxide having a layer structure include $LiCoO_2$, $LiNi_{1-x}Co_{x-y}Al_yO_2$ wherein $0.1 \leq x \leq 0.3$ and $0.01 \leq y \leq 0.2$, and an oxide containing at least Co, Ni and Mn such as $LiMn_{1/3}Ni_{1/3}Co_{1/3}O_2$, $LiMn_{5/12}Ni_{5/12}Co_{1/6}O_2$ and $LiNi_{3/5}Mn_{1/5}Co_{1/5}O_2$.

A negative electrode active material includes a lithium metal, a lithium alloy such as lithium aluminum alloy, a carbonaceous material which can store and release lithium, graphite, cokes such as a phenol resin and a furan resin, carbon fibers, glass-like carbon, pyrolytic carbon and active carbon.

A positive electrode current collector includes aluminum foil, nickel foil, and foil made of combination of aluminum and nickel. A negative electrode current collector includes copper foil, gold foil, nickel foil, copper alloy foil, and foil made of a combination of two or more selected from copper, gold, nickel and copper alloy.

An electroconductive aid which can be used for producing an electrode by using the electrode active material includes carbon black such as acetylene black and ketjen black, metal fibers such as aluminum fibers and nickel fibers, natural graphite, heat-expanding graphite, carbon fibers, ruthenium oxide and titanium oxide. Among these, acetylene black or ketjen black is preferable as it can provide desired conductivity with addition of a small amount thereof.

A binder which can be used with the electroconductive aid can include various known binders. Examples of the binder include polytetrafluoroethylene, polyvinylidene fluoride, carboxymethyl cellulose, a cross-linked polymer of fluoroolefin copolymers, styrene-butadiene copolymer, polyacrylonitrile and polyvinyl alcohol. The binder may be dissolved in a solvent and used. Examples of the solvent include N-methyl-2-pyrrolidone (NMP).

As for the electrolyte solution, a solution in which a lithium salt is dissolved in an organic solvent can be used. The lithium salt is not particularly limited insofar as it dissociates in a solvent to form a $Li^+$ ion and does not easily cause a side reaction such as decomposition within the voltage range in which the battery is used. Examples of the lithium salt include an inorganic lithium salt such as $LiClO_4$, $LiPF_6$, $LiBF_4$, $LiAsF_6$, and $LiSbF_6$, and an organolithium salt such as $LiCF_3SO_3$, $LiCF_3CO_2$, $Li_2C_2F_4(SO_3)_2$, $LiN(CF_3SO_2)_2$, $LiC(CF_3SO_2)_3$, $LiCnF_{2n+1}SO_3$ ($n \geq 2$), and $LiN(RfOSO_2)_2$ wherein Rf represents a fluoroalkyl group. Preferred examples of the lithium salt include $LiPF_6$, $LiClO_4$, $LiAsF_6$, $LiBF_4$, $LiCF_3SO_3$ and $Li(CF_3SO_2)_2N$.

An organic solvent used for an electrolyte solution is not particularly limited insofar as it can dissolve the lithium salt and does not cause a side reaction such as decomposition within the voltage range in which the battery is used. Examples of the solvent include, but not limited to, cyclic carbonate esters such as propylene carbonate and ethylene carbonate, chain carbonate esters such as ethyl methyl carbonate, diethyl carbonate, dimethyl carbonate and dipropyl carbonate, and a mixture thereof. When a mixture of the cyclic carbonate ester and the chain carbonate ester is used, a volume ratio of the cyclic carbonate ester to the chain carbonate ester is preferably from 4:1 to 1:4 from the viewpoint of optimizing the permittivity and viscosity.

According to the invention, a shape of the non-aqueous electrolyte battery can include a prism type or a cylindrical type in which a steel can or an aluminum can is used as a casing (i.e., can casing). Further, it can be a soft package battery in which a laminate film having metal deposited is used as a casing.

Hereafter, specific embodiments of the present invention will be described in detail by way of examples. However, it should not be construed that the present invention is limited to those examples.

EXAMPLES

Synthetic Example 1

The 20 parts by weight of polyvinyl alcohol having a viscosity of 11 mPa·s in an aqueous 4% by weight solution thereof and 10 parts by weight of polyvinyl alcohol having a viscosity of 14 mPa·s in an aqueous 4% by weight solution thereof were mixed in 120 parts by weight of water until the polyvinyl alcohols are homogeneously dissolved. Next, 100 parts by weight of aqueous 12.5% by weight caustic soda solution was added thereto and mixed with the aqueous solution of polyvinyl alcohols to become homogeneous. Then, 150 parts by weight of acrylonitrile and 120 parts by weight of isopropyl alcohol were added thereto and reacted for 5 hours at 30° C. An aqueous 25% acetic acid solution was added thereto for neutralization wherein the molar amount of acetic acid added was the same as that of caustic soda used. After the neutralization, water was added thereto under stirring to allow crude cyanoethyl polyvinyl alcohol to precipitate. The crude cyanoethyl polyvinyl alcohol was purified by washing with water and re-precipitation after dissolution. After drying, cyanoethyl polyvinyl alcohol was obtained.

Synthetic Example 2

Cyanoethyl polyvinyl alcohol was obtained in the same manner as in Synthetic Example 1 except that 5.4 parts by weight of polyvinyl alcohol having a viscosity of 3.5 mPa·s in an aqueous 4% by weight solution thereof and 24.6 parts by weight of polyvinyl alcohol having a viscosity of 25 mPa·s in an aqueous 4% by weight solution thereof were used.

Synthetic Example 3

Cyanoethyl polyvinyl alcohol was obtained in the same manner as in Synthetic Example 1 except that 21 parts by weight of polyvinyl alcohol having a viscosity of 3.5 mPa·s in an aqueous 4% by weight solution thereof and 9 parts by weight of polyvinyl alcohol having a viscosity of 45 mPa·s in an aqueous 4% by weight solution thereof.

Synthetic Example 4

Cyanoethyl polyvinyl alcohol was obtained in the same manner as in Synthetic Example 1 except that 30 parts by weight of polyvinyl alcohol having a viscosity of 3.5 mPa·s in an aqueous 4% by weight solution thereof.

Synthetic Example 5

Cyanoethyl polyvinyl alcohol was obtained in the same manner as in Synthetic
Example 1 except that 30 parts by weight of polyvinyl alcohol having a viscosity of 40 mPa·s in an aqueous 4% by weight solution thereof.

Synthetic Example 6

Cyanoethyl polyvinyl alcohol was obtained in the same manner as Synthetic Example 1 except that 30 parts by weight of polyvinyl alcohol having a viscosity of 5.5 mPa·s in an aqueous 4% by weight solution thereof.

Synthetic Example 7

Cyanoethyl polyvinyl alcohol was obtained in the same manner as in Synthetic Example 1 except that 30 parts by weight of polyvinyl alcohol having a viscosity of 30 mPa·s in an aqueous 4% by weight solution thereof.

Synthetic Example 8

Cyanoethyl polyvinyl alcohol was obtained in the same manner as in Synthetic Example 1 except that polyvinyl alcohol was added to a mixture of water and an aqueous solution of caustic soda and dissolved therein, followed by addition of acrylonitrile and isopropyl alcohol.

With respect to the cyanoethyl polyvinyl alcohols obtained in Synthetic Examples 1 to 8, a weight-average molecular weight, a molecular weight distribution and the content (% by weight) of low molecular weight portion having a molecular weight of 30,000 or less were obtained in accordance with the methods described below. The results are given in Table 1.
(a) Weight-average Molecular Weight (Mw) and Molecular Weight Distribution (Mw/Mn)
Cyanoethyl polyvinyl alcohol was dissolved in a solution of lithium bromide in dimethylformamide having a lithium bromide concentration of 0.05 mol/L, in such an amount that a concentration of the cyanoethyl polyvinyl alcohol becomes 0.2% by weight. Then, it was filtered using a 0.45 μm filter. The resulting sample was subjected to GPC measurement under the following conditions so that a weight-average molecular weight and a molecular weight distribution were calculated.

Apparatus: Gel permeation chromatography GPC (apparatus No. GPC-10)
Detector: Differential refractive index detector RI (RI-8020 produced by Tosoh Corporation, sensitivity: 32,)
Column: TSKgel α-M (two columns) (ϕ7.8 mm×30 cm, product of Tosoh Corporation)
Flow rate: 0.8 mL/min
Column temperature: 23° C.
Injection amount: 0.200 mL
Standard sample: Monodisperse polystyrene produced by Tosoh Corporation
The molecular weight distribution means the ratio of a weight-average molecular weight (Mw) to a number-average molecular weight (Mn) obtained by GPC, and is calculated by using the following formula.

MWD=Mw/Mn (b) Low Molecular Weight Portion Having Molecular Weight of 30,000 or Less
The content (% by weight) of low molecular weight portion having a molecular weight of 30,000 or less with respect to cyanoethyl polyvinyl alcohol was obtained by dividing the integrated value of GPC curve from the molecular weight of from 0 to 30,000 by the integrated value of GPC curve from molecular weight of from 0 to 10,000,000, and multiplying the resulting value by 100.
(c) Nitrogen Content
Nitrogen content in the cyanoethyl polyvinyl alcohol obtained was measured by Kjeldahl method, and the ratio of replacement by cyanoethyl groups was calculated therefrom.

TABLE 1

|  | Weight-average molecular weight | Molecular weight distribution | Content of low molecular weight portion (wt %) | Ratio of replacement by cyanoethyl groups |
| --- | --- | --- | --- | --- |
| Syn. Ex. 1 | 248000 | 3.66 | 10.2 | 75.7 |
| Syn. Ex. 2 | 356000 | 4.91 | 16.7 | 72.6 |
| Syn. Ex. 3 | 138000 | 6.31 | 38.5 | 75.3 |
| Syn. Ex. 4 | 43000 | 1.34 | 56.8 | 68.4 |
| Syn. Ex. 5 | 1248000 | 2.02 | 3.2 | 70.5 |
| Syn. Ex. 6 | 72000 | 1.65 | 18.5 | 74.9 |
| Syn. Ex. 7 | 780000 | 1.87 | 5.3 | 74.8 |
| Syn. Ex. 8 | 246000 | 3.47 | 27.8 | 27.6 |

Example 1

Production of Battery

The positive and negative electrodes which had been obtained in the method described below were wound together in whirlpool form while a separator is interposed therebetween to produce a winding electrode body. The resulting winding electrode body was flattened into a flat shape and placed in an aluminum can casing. After injection of a 1 mol/L electrolyte solution of lithium phosphate hexafluoride (LiPF$_6$) in a mixed solvent of ethylene carbonate and ethyl methyl carbonate (volume ratio of 2:1), the can casing was sealed to produce a lithium ion secondary battery.
(a) Production of Separator
The 40 parts by weight of Al$_2$O$_3$ (alumina) was added to the solution obtained by dissolving 10 parts by weight of cyanoethyl polyvinyl alcohol obtained in Synthetic Example 1 in 190 parts by weight of methyl ethyl ketone, and mixed using a ball mill to prepare a slurry. Both surfaces of a polyethylene porous film having a thickness of 16 μm and a porosity (void ratio) of 40% were coated with the slurry prepared by using a dip coating method and dried to produce a separator. The thickness of the heat-resistant porous film was 5 μm after drying. The heat-resistant porous layer in the separator has an average pore diameter of 0.6 μm and a porosity of 65%. The average pore diameter was measured by using a mercury intrusion porosimeter (produced by Quantachrome Instruments). After obtaining the true density of the inorganic filler, volume of the heat-resistant porous layer and weight of the heat resistant porous layer, the porosity was calculated based on the formula described above. The true density of the inorganic filler was measured by using a device for measuring true density (produced by Seishin Kigyo Co., Ltd.).

(b) Production of Positive Electrode

The 85 parts by weight of lithium cobalt oxide ($LiCoO_2$) as a positive electrode active material, 10 parts by weight of acetylene black as an electroconductive aid, and 5 parts by weight of polyvinylidene fluoride (PVDF) as a binder were homogeneously mixed in 100 parts by weight of N-methyl-2-pyrrolidone (NMP) as a solvent to prepare a paste containing a positive electrode mix. Both surfaces of a current collector having a thickness of 15 μm were coated with the resulting paste containing a positive electrode mix. The current collector was made of an aluminum foil. After drying and calendaring, a positive electrode having a total thickness of 150 μm was produced. Further, an aluminum tab was welded on an exposed area of the positive electrode aluminum foil to form a lead portion.

(c) Production of Negative Electrode

The 95 parts by weight of graphite as a negative electrode active material and 5 parts by weight of PVDF as a binder were homogeneously mixed in 100 parts by weight of NMP as a solvent to prepare a paste containing a negative electrode mix. Both surfaces of a current collector having a thickness of 10 μm were coated with the resulting paste containing a negative electrode mix. The current collector was made of a copper foil. After drying and calendaring, a negative electrode having a total thickness of 142 μm was produced. Further, a nickel tab was welded on an exposed area of the negative electrode copper foil to form a lead portion.

Example 2

The lithium ion secondary battery was produced in the same manner as in Example 1 except that the separator was produced by using the cyanoethyl polyvinyl alcohol obtained in Synthetic Example 2. The heat-resistant porous layer in the separator had an average pore diameter of 0.4 μM and a porosity of 55%.

Example 3

The lithium ion secondary battery was produced in the same manner as in Example 1 except that the separator was produced by using the cyanoethyl polyvinyl alcohol obtained in Synthetic Example 6. The heat-resistant porous layer in the separator had an average pore diameter of 0.3 μm and a porosity of 63%.

Example 4

The lithium ion secondary battery was produced in the same manner as in Example 1 except that the separator was produced by using the cyanoethyl polyvinyl alcohol obtained in Synthetic Example 7. The heat-resistant porous layer in the separator had an average pore diameter of 0.3 μm and a porosity of 63%.

Example 5

The lithium ion secondary battery was produced in the same manner as in Example 1 except that a 1 mol/l $LiPF_6$ solution obtained by dissolving $LiPF_6$ in a mixed solvent of ethylene carbonate, ethylmethyl carbonate and diethyl carbonate (volume ratio of 1:2:1) was used as an electrolyte solution. The heat-resistant porous layer in the separator had an average pore diameter of 0.3 μm and a porosity of 63%.

Example 6

The lithium ion secondary battery was produced in the same manner as in Example 1 except that a polyethylene terephthalate porous film having a thickness of 20 μm and a porosity (void ratio) of 70% was used instead of the polyethylene porous film and aluminum nitride was used instead of $Al_2O_3$ (alumina) to produce a separator. The heat-resistant porous layer in the separator had an average pore diameter of 0.5 μm and a porosity of 65%.

Example 7

The lithium ion secondary battery was produced in the same manner as in Example 1 except that a mixture of 5 parts by weight of cyanoethyl polyvinyl alcohol obtained in Synthetic Example 1 and 5 parts by weight of vinylidene fluoride-chloro trifluoroethylene copolymer was used instead of 10 parts by weight of cyanoethyl polyvinyl alcohol obtained in Synthetic Example 1 to produce a separator. The heat-resistant porous layer in the separator had an average pore diameter of 0.4 μm and a porosity of 55%.

Comparative Example 1

The lithium ion secondary battery was produced in the same manner as in Example 2 except that cyanoethyl polyvinyl alcohol obtained in Synthetic Example 3 was used to produce a separator. The heat-resistant porous layer in the separator had an average pore diameter of 0.6 μm and a porosity of 59%.

Comparative Example 2

A slurry was prepared in the same manner as in Example 1 except that the cyanoethyl polyvinyl alcohol obtained in Synthetic Example 4 was used. When a polyethylene porous film was coated with the slurry, the viscosity of the slurry was low so that dripping occurred and a separator having a uniform thickness could not be obtained.

Comparative Example 3

A slurry was prepared in the same manner as in Example 1 except that the cyanoethyl polyvinyl alcohol obtained in Synthetic Example 5 was used. When a polyethylene porous film was coated with the slurry, the viscosity of the slurry was high so that a separator having a uniform thickness could not be obtained.

Comparative Example 4

A slurry was prepared in the same manner as in Example 1 except that the cyanoethyl polyvinyl alcohol obtained in Synthetic Example 8 was used. When a polyethylene porous film was coated with the slurry, the cyanoethyl polyvinyl alcohol did not fully dissolve in the solvent so that the viscosity of the slurry was low and dripping occurred. Consequently, a separator having a uniform thickness could not be obtained.

<Evaluation of Battery>

Evaluation of Heat Resistance

The lithium ion secondary batteries produced above were left at 150° C. for 1 hour and 180° C. for 1 hour, and then examined. The batteries operated normally were evaluated as "good" and the battery not operated normally owing to short circuit was evaluated as "poor". The results are shown in Table 2. The lithium ion secondary battery obtained in Comparative Example 1 did not operate normally after left at 180° C. for 1 hour. It can be explained as follows. Since the low molecular weight portion in the cyanoethyl polyvinyl alcohol, which was a binder in the heat-resistant porous layer, started to dissolve in an electrolyte solution, mechanical strength of the heat resistant porous layer in the battery obtained in Comparative Example 1 was lowered. As a result, heat resistance became insufficient and the polyethylene porous film melted and shrank at high temperature so that internal short circuit took place. On the other hand, each of the lithium ion secondary batteries obtained in Examples 1 to 7 operated normally at each of the temperatures. It can be considered that the heat resistant porous layers in the batteries obtained in Examples 1 to 7 had high mechanical strength and high heat resistance so that the polyethylene porous films did not melt.

TABLE 2

| | Heat resistance evaluation | |
|---|---|---|
| | 150° C. for 1 hour | 180° C. for 1 hour |
| Example 1 | Good | Good |
| Example 2 | Good | Good |
| Example 3 | Good | Good |
| Example 4 | Good | Good |
| Example 5 | Good | Good |
| Example 6 | Good | Good |
| Example 7 | Good | Good |
| Comp. Ex. 1 | Good | Poor |

Good: The battery operated normally.
Poor: The battery did not operate normally because of short circuit.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A binder for a separator of a non-aqueous electrolyte battery, the binder comprising 2-cyanoethyl group-containing polymer having: a molecular weight distribution (Mw/Mn), which is a ratio of the weight-average molecular weight (Mw) to the number-average molecular weight (Mn), of 6 or less; the weight-average molecular weight (Mw) of 50,000 to 1,000,000; and, 30% by weight or less of a low molecular weight portion having a molecular weight of 30,000 or less.

2. The binder for a separator of a non-aqueous electrolyte battery according to claim 1, wherein a ratio of replacement by cyanoethyl groups in the 2-cyanoethyl group-containing polymer is 50% or more.

3. The binder for a separator of a non-aqueous electrolyte battery according to claim 2, wherein the 2-cyanoethyl group-containing polymer is cyanoethyl polyvinyl alcohol.

4. A separator of a non-aqueous electrolyte battery, the separator comprising a porous substrate, and a heat-resistant porous layer comprising the binder according to claim 1 and an inorganic filler.

5. The separator according to claim 4, wherein the porous substrate is a substrate of polyolefin, polyester, polyacetal, polyamide, polycarbonate, polyimide, polyether ether ketone, polyether sulfone, or any combination thereof.

6. The separator according to claim 5, wherein the inorganic filler is selected from a group consisting of inorganic oxides, inorganic nitrides, ionic crystals selected from a group consisting of calcium fluoride, barium fluoride and barium sulfate, covalent crystals, clay, a material derived from a mineral, lithium titanium phosphate represented by $Li_xTi_y(PO_4)_3$ wherein x and y are numbers satisfying $0<x<2$ and $0<y<3$, respectively, and any combination thereof.

7. A non-aqueous electrolyte battery comprising a positive electrode, a negative electrode, a separator according to claim 4, and a non-aqueous electrolyte solution.

8. The non-aqueous electrolyte battery according to claim 7, wherein the electrolyte solution comprises a cyclic carbonate ester selected from the group consisting of ethylene carbonate and propylene carbonate; a chain carbonate ester selected from the group consisting of dimethyl carbonate, ethyl methyl carbonate and diethyl carbonate; and a lithium salt.

9. A non-aqueous electrolyte battery comprising a positive electrode, a negative electrode, a separator according to claim 6, and a non-aqueous electrolyte solution.

10. The non-aqueous electrolyte battery according to claim 9, wherein the electrolyte solution comprises a cyclic carbonate ester selected from the group consisting of ethylene carbonate and propylene carbonate; a chain carbonate ester selected from the group consisting of dimethyl carbonate, ethyl methyl carbonate and diethyl carbonate; and a lithium salt.

* * * * *